Patented Mar. 3, 1942

2,274,999

UNITED STATES PATENT OFFICE 2,274,999

GLASS-TO-METAL SEAL

Victor O. Allen, Madison, N. J., assignor to Wilbur B. Driver Company, Newark, N. J., a corporation of New Jersey No Drawing. Application April 8, 1940, Serial No. 328,595

5 Claims. (Cl. 75—126)

This invention relates to improvements in glass-to-metal seals, more particularly to improved types of alloys which are especially effective in this field.

The art of sealing metal to glass is an old one. In earlier years when the problems encountered were not especially difficult the seals were quite satisfactory. However, as the arts in which glass-to-metal seals were employed advanced, new problems were introduced. Typical of such problems were those introduced by the radio industry. With the advent of high vacuum tubes having conductive sealed in members, new and difficultily attainable criteria for metal-to-glass seals were established. The problems in metal sealing are accentuated in certain products, as for example in power tubes where the combination of vacuum and relatively wide operative temperature ranges are encountered.

Illustrative of the intrinsic difficulty of glass-to-metal sealing is the current practice in the vacuum tube industry. Optimum conditions for efficient vacuum tube production involve the use of a reasonably cheap glass bulb and a metal or alloy having good mechanical and electrical properties which will form an effective seal with the glass over substantial vacuum and temperature ranges. The current practice is an admission that such optimum conditions have not yet been attained. The typical practice now employed consists of utilizing an alloy of 28% chrome iron as a sealing metal to a steam or header of an expensive glass, which latter is itself sealed to a cheaper lead glass bulb. Such an operation, involving sealing two glasses with different coefficients of expansion, is difficult and entails considerable loss.

The requirements for a good sealing metal for such uses as electrical discharge apparatus have long been known. The major essential characteristics are that the metal shall wet the glass and the metal should have a coefficient of expansion close to or approximating that of the glass over a critical temperature range, that is to say be sufficiently close to that of glass so that stresses set up by differential expansion and contraction will not exceed the tensile strength of the glass. The ideal metal for employment in the arts, as for example in the vacuum tube art, in addition to these two major properties also should be characterized by an ease of production and fabrication, particularly a nice balance between hardness and working properties, and by good corrosion resistance.

The mechanism of sealing a glass to a metal is generally accepted. This depends essentially upon a common solute effect and involves the formation of a thin adherent layer of oxide on the metal surface and the elevation of the temperature of the glass and metal to a point where the oxide layer or interface partially dissolves in the glass. As those skilled in the art know, the thickness of the oxide layer on the metal must be maintained within fairly narrow ranges in order to insure proper cementation. If the oxide film is too thin then there is a tendency for all of the oxide to be absorbed in the glass with the result that the adhesion between metal and glass is too weak. If the oxide is too thick the adhesion between the subjacent metal and the metal oxide layer may become too weak.

The development in the art to date comprehends four general types of seals. The first type involves the use of special metals such as platinum, molybdenum and tungsten whose thermal expansion, in the substantially pure state, closely approximate that of glass. The second type comprises composite and heterogeneous metallic structures such as "Dumet" (an iron-nickel alloy core sheathed with copper). The third type consists of a tapered edge seal utilizing relatively soft metals such as copper which are so constructed and designed that the metal in the seal yields before the glass. The fourth and latest type comprises special alloys whose expansion characteristics closely approximate those of glass. Illustrative of this type are chrome iron, fernico and fernichrome.

Recent researches in this field have been largely directed to the production of the special ferrous base alloys. This general type of material presents advantages over the early forms of metallic structures, such as the single or composite metal members particularly in the amenability of the alloys to modifications of physical and electrical properties which are important in the fabrication and use of articles having a glass-to-metal seal.

The chrome iron seals, i. e. those utilizing an iron alloy containing from about 26 to 28% chromium, have been used extensively for sealing lime and lead glasses. Chrome-iron is wetted readily by both lime and lead glasses and forms an oxide layer of the desirable restricted thickness. However, the thermal expansion of chrome iron is substantially a straight line function of temperature. On the other hand substantially all glasses are characterized by a sharp change in thermal expansion in the so-called "transition zone" as well as in the annealing range. For this reason chrome-iron is unsuitable for use with standard lead and lime glasses if the seals are to be annealed, as is the case in the production of electrical discharge apparatus. Therefore, in the past, when chrome-iron has been utilized in this field it has been necessary, as previously indicated, to utilize a special and expensive type of glass for sealing with this alloy.

As indicated above, there has been recently developed some special forms of alloy for utilization in a glass-to-metal seal. These alloys, known as "fernichrome" and "fernico" are essentially ferro-nickel base alloys of the general invar type which contain additions of cobalt or cobalt and chromium. Fernichrome is an alloy consisting of 27% iron, 30% nickel, 25% cobalt and 8% chromium. Fernico is an alloy consisting of 54% of iron, 28% of nickel and 18% of cobalt. These alloys represent an improvement in the art in that they match lead and lime glass more closely especially in the critical range, than does chrome-iron. Disadvantages of these types of materials, however, are an excess cost, difficult working characteristics and poor oxide-forming characteristics. As is known, the addition of high percentages of cobalt to ferro-chrome and ferro-nickel base alloys very markedly increases the hardness of the alloy. This is a particularly important factor in the electron discharge tube field in which these alloys must be drawn to rather fine dimensions from relatively massive units. This type of cobalt-containing alloy may be considered as a base-alloy of the general invar type, i. e. ferro-nickel, whose expansion characteristics in the transition and annealing zone have been advantageously modified by cobalt additions.

The ready availability, cheapness and desirable working properties of chrome-iron renders it an ideal base material for the production of metal alloys for employment in this art. If such base alloy material could be modified so as to bring the thermal expansion characteristics more into coincidence with that of glass and particularly the cheap lead glasses, the optimum characteristics of glass to metal sealing would be very closely approached. If such new material could be produced in different specific compositions with a reasonably wide variation in thermal expansion to coincide with or approximate the expansion of different types of glass a new and wide permissive choice of materials would be established.

As a result of extensive experimentation it has now been discovered that chrome-iron can so advantageously be modified. It has been further found that this modification may be effected under very wide permissive range and by utilizing readily available and relatively inexpensive alloying constituents.

It has been determined that such a desirable modification of the expansion characteristics of chrome-iron can be made while retaining the other desirable characteristics of this alloy. It has been found specifically that the thermal expansion of 26% to 28% chrome-iron can be lowered by adding thereto predetermined percentages of a heavy transition metal, particularly heavy metals of the sixth group of the periodic table, viz, molybdenum, tungsten and uranium.

It has further been found that the effect of such addition metals in lowering the thermal expansion of the base alloy bears a definite relationship to the atomic structure or atomic weight of the metal, the effect being greater for the heavier metals, that is to say for the same percentages by weight the effect is least for molybdenum and greatest for uranium.

Another very interesting phase of the phenomenon is that the lowering of the coefficient of expansion of the chrome-iron is directly proportional to the amount of addition agent.

No attempt is made precisely to state the role or mechanism of these metal addition agents in so unexpectedly modifying the thermal expansion characteristics of the host alloy. The modification of the crystalline structure of the base alloy upon addition of the stated alloying addition agents does not permit a simple apriori prediction of modification of the expansion characteristics. It is a fact, however, that the addition of the stated alloying constituents very markedly modifies the thermal dilation of the chrome-iron alloy.

It will be understood that since each molybdenum, tungsten and uranium has a specific and proportional effect in lowering the expansion of the host alloy, these elements may be added to the base alloy in combination and in varying respective percentages to secure the desired control of thermal expansion while at the same time within limits modifying the physical characteristics of the resulting alloy.

The new series of alloys, i. e. chrome-iron with varying percentages of molybdenum, tungsten and uranium or any predetermined percentages of two or more of these alloy addition agents may be made up by methods known to those skilled in the art. The alloying elements may be added to the melt either as pure metals or as ferro alloys along with the ferro chrome to secure an alloy of any desired analysis. It will be appreciated also that other alloy addition agents may be utilized for modifying the physical characteristics of the ultimate alloy provided they have no adverse effect on the specific thermal expansion desired.

In accordance with the invention a series of alloys of different analysis have been produced and tested with excellent results. Of these the following alloys are typical:

*Alloy A*

| | Per cent |
|---|---|
| Chromium | 28 |
| Molybdenum | 2 |
| Iron | Balance |

*Alloy B*

| | |
|---|---|
| Chromium | 28 |
| Molybdenum | 2 |
| Iron | Balance |

*Alloy C*

| | |
|---|---|
| Chromium | 28 |
| Tungsten | 4 |
| Iron | Balance |

Alloys A, B and C, noted above, were utilized as pins in the construction of complete vacuum tubes and were life tested with most favorable results.

These new alloys are characterized by a marked reduction in thermal expansion, as compared to chrome-iron alloys are of a character which brings the thermal expansion more into coincidence with that of typical glass. It is thus a very valuable and unexpected finding that the chrome-iron base alloys could so advantageously be modified by the incorporation of cheap and readily available alloying constituents.

Alloys A, B and C, mentioned herein, are cited only as typical examples of the class of alloys producible under the invention. As indicated hereinbefore the percentage of the alloying ingredient, such as molybdenum, tungsten, uranium and the like may be varied to secure a commensurate modification in thermal expansion characteristics. Thus the percentage of the addition agent may extend from about 1% or less to 6% or more. It will also be understood that the invention is not limited to the specific chromium content of alloys A, B and C. Improved alloys may be produced by alloying lower percentages of chromium with the modifying addition agents which display an advantageous modification of thermal expansion and thus renders them useful in those fields in which this factor is important.

As will have been appreciated, the present invention provides a simple and effective method of adjusting the thermal expansion of a chrome-iron base alloy to a desired predetermined value and within a relatively wide range of values. The particular expansion value of the chrome-iron which is desired for any particular glass may be attained by simply adding the proper proportion of one or more of the described metals. It will be appreciated also that while the new alloys are particularly effective for glass-to-metal sealing in the production of electrical discharge devices, such as vacuum tubes and gas filled tubes, they are equally available in any art or circumstance where a controlled thermal expansion is an important and desirable characteristic. Thus while preferred modifications of the invention have been described, it is to be understood that these are given didactically to illustrate the underlying principles involved and not as limiting the useful scope of the invention.

I claim:

1. As a new material for glass-to-metal seals an alloy containing 26 to 28% chromium and between about 1% and 6% of a metal chosen from the group consisting of molybdenum, tungsten and uranium sufficient to materially lower the coefficient of expansion of the chrome-iron the remainder of the alloy being iron.

2. A new material for glass-to-metal seals characterized by a low coefficient of thermal expansion comprising an alloy containing between substantially 26% and 28% chromium substantially 2% of molybdenum the remainder of the alloy being iron.

3. A new material for glass-to-metal seals characterized by a low coefficient of thermal expansion comprising an alloy containing between substantially 26% and 28% chromium substantially 4% of tungsten the remainder being iron.

4. A new material for glass-to-metal seals characterized by a low coefficient of thermal expansion comprising an alloy containing between about 26% and 28% chromium substantially 4% of uranium the remainder being iron.

5. A new material for glass-to-metal seals characterized by a low coefficient of thermal expansion comprising an alloy containing between about 26% to 28% chromium from substantially 2% to 6% of a metal chosen from the group consisting of molybdenum, tungsten and uranium the remainder being iron.

VICTOR O. ALLEN.